United States Patent [19]

Knight

[11] Patent Number: 5,215,333
[45] Date of Patent: Jun. 1, 1993

[54] SEAT BELT ADJUSTMENT BAND

[76] Inventor: Candice T. Knight, 8521 Larch La., Evansville, Ind. 47710

[21] Appl. No.: 832,360

[22] Filed: Feb. 7, 1992

[51] Int. Cl.$^5$ ............................................. B60R 22/30
[52] U.S. Cl. ................................ 280/801 R; 280/808; 297/482; 297/483; 24/306
[58] Field of Search ................ 280/801, 808; 297/482, 297/483; 24/306, 171; 224/901, 264

[56] References Cited

U.S. PATENT DOCUMENTS

| | | | |
|---|---|---|---|
| 3,291,528 | 12/1966 | Sencabaugh | 297/482 X |
| 4,289,352 | 9/1981 | Ashworth | 297/473 |
| 4,648,625 | 3/1987 | Lynch | 297/483 X |
| 4,832,367 | 5/1989 | Lisenby | 280/808 |
| 4,886,318 | 12/1989 | Pennock | 297/482 |
| 4,929,027 | 5/1990 | Beauvias | 280/808 |
| 4,938,535 | 7/1990 | Condon et al. | 280/808 X |
| 4,946,198 | 8/1990 | Pittore et al. | 280/808 |
| 4,951,965 | 8/1990 | Brown | 280/801 |
| 5,042,838 | 8/1991 | Carter | 280/808 |
| 5,135,257 | 8/1992 | Short | 280/801 X |

FOREIGN PATENT DOCUMENTS 2048651  12/1980  United Kingdom ............... 280/801

*Primary Examiner*—Russell D. Stormer
*Assistant Examiner*—Gary C. Hoge
*Attorney, Agent, or Firm*—Richard C. Litman

[57] ABSTRACT

A seat belt adjustment band is provided which changes the location of the shoulder belt. The seat belt adjustment band removably attaches to an existing vehicle seat belt assembly. The seat belt adjustment band is connected the shoulder belt and to the lap belt effectively changing the location of the shoulder belt to keep the shoulder belt from rubbing against the face of or neck of the wearer. Band is adjustable and can slide along the lap belt to position the shoulder belt to any angle. This affords adjustment which is individualized for the comfort of any user.

7 Claims, 2 Drawing Sheets

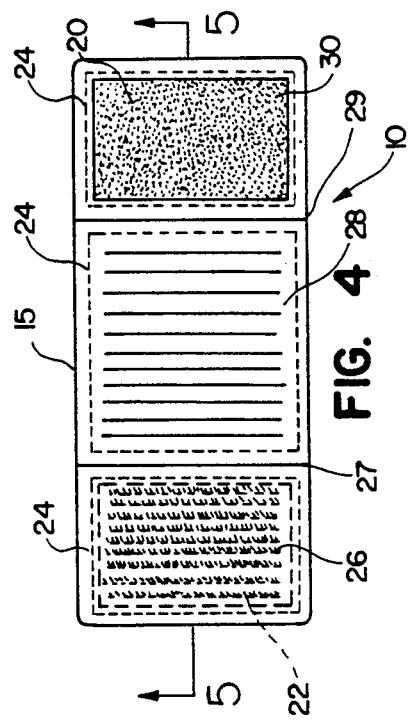
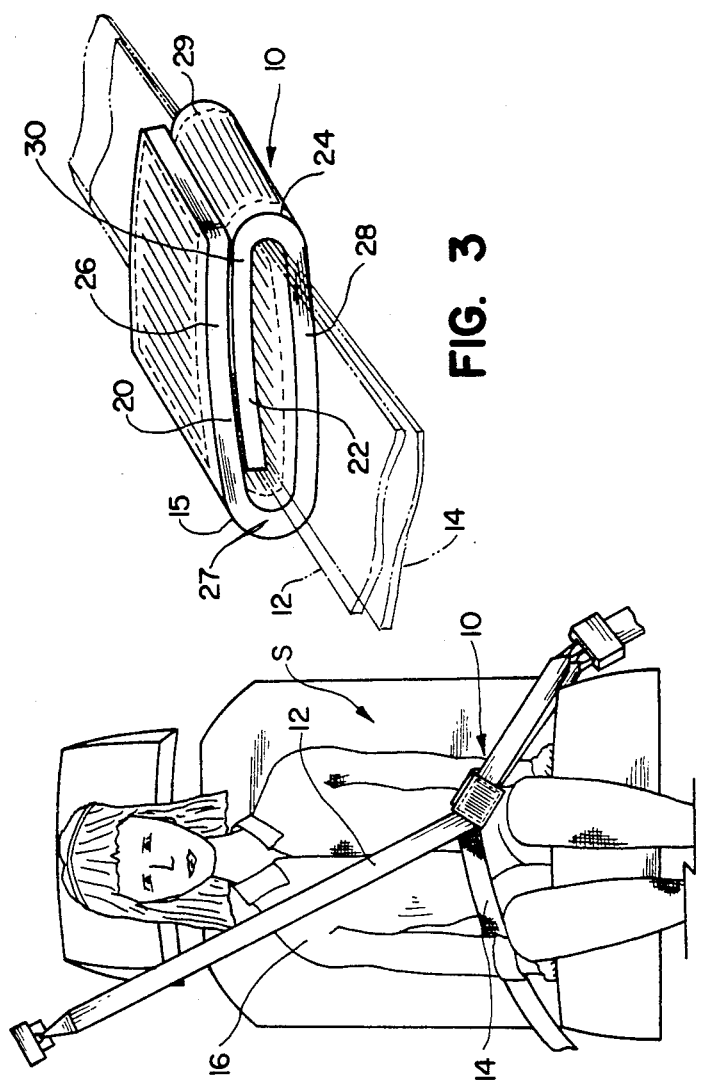
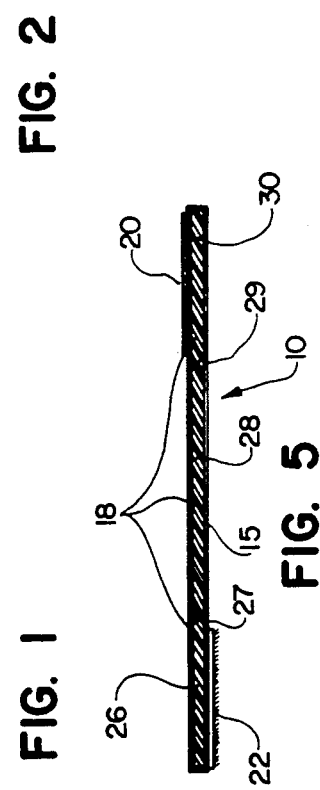
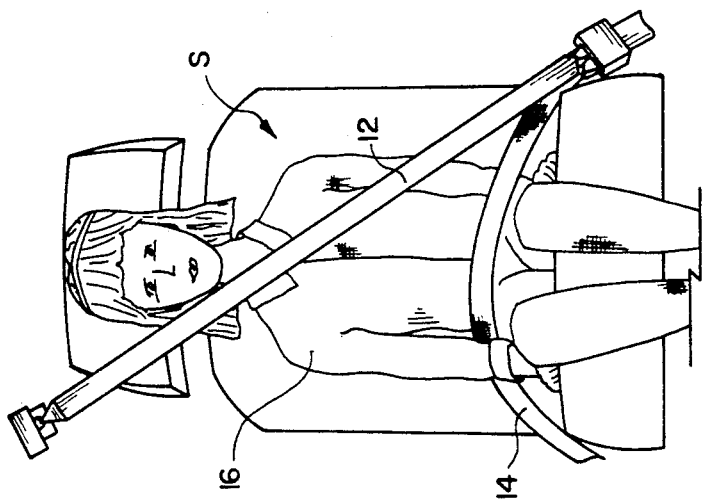

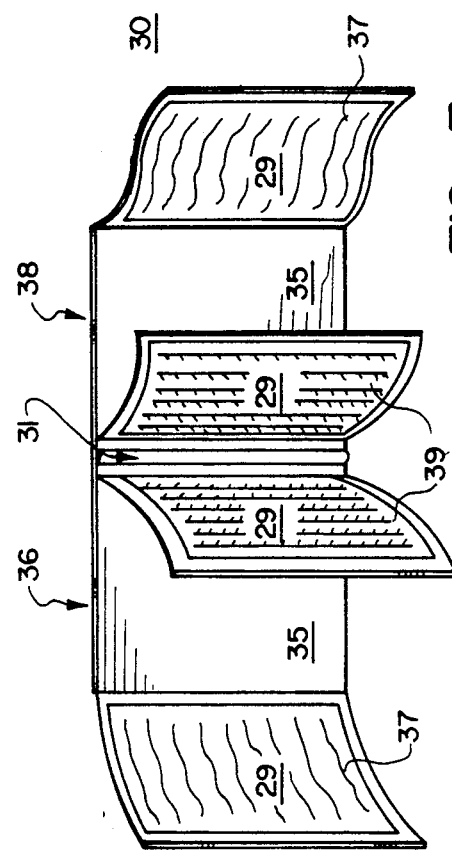
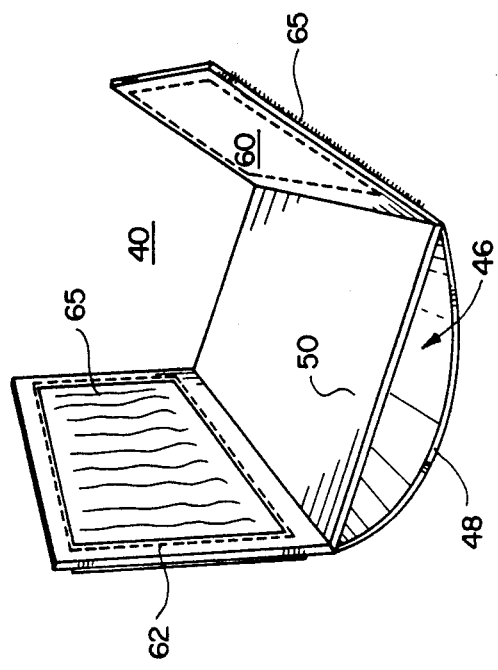
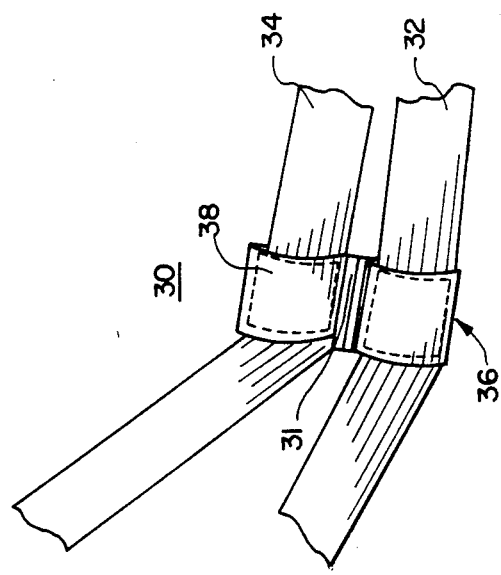
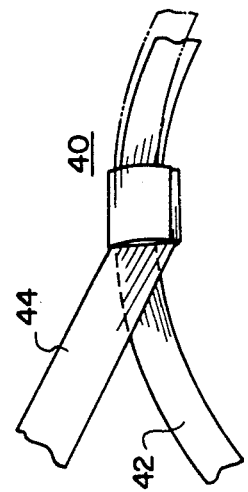

SEAT BELT ADJUSTMENT BAND

FIELD OF THE INVENTION

The present invention relates to a device which attaches to a vehicle seat belt. More specifically the present invention relates to a removable band which adjusts the angle of the shoulder belt in a vehicle seat belt assembly.

DESCRIPTION OF THE PRIOR ART

Devices for use with seat belts are known in the art. U.S. Pat. No. 4,289,352 issued on Sep. 15, 1981 to Roger Ashworth discloses a shoulder height adjuster for a seat belt system. A connector which interfaces with both the shoulder and lap belt is indicated. The connector adjusts the effective height of the shoulder belt.

U.S. Pat. No. 4,886,318 issued on Dec. 12, 1989 to Betty Pennock discloses an attachment for a safety belt harness. A foam body is fitted within a fabric sleeve and a plurality of tape fasteners. The attachment is designed to encase the metal fasteners of a seat belt harness to prevent damage to the user of the harness.

U.S. Pat. No. 4,951,965 issued on Aug. 28, 1990 to Gregory Brown discloses a vehicle seat belt retainer for a child. The retainer comprises a strap to circumscribe the child's buttocks from the child's lap when the child is in a seated position in the vehicle.

None of the above referenced devices, considered either singly or in combination, is seen to suggest the instant invention as claimed.

SUMMARY OF THE INVENTION

Seat belts are provided in vehicles in just one size. In some cases, the diagonal strap or shoulder belt rubs against the seat belt users face, ears or neck. This abrasion causes discomfort which ranges from annoying to unbearable. Most users remedy this problem by tucking the shoulder belt under the user's arm which defeats the purpose of the shoulder belt. The instant invention is a band which can be placed about the lap belt and shoulder belt, effectively adjusting the location of the shoulder belt away from the face area. The band can be placed in such a manner to comfortably accommodate any size individual or children.

Accordingly, one object of the present invention is to provide a band to adjust the location of the shoulder strap of a seat belt assembly.

Another object of the present invention is to provide a band which is easily removable and can be used on any seat belt assembly.

These and other objects of the present invention will become readily apparent upon further review of the following specification and drawings.

BRIEF DESCRIPTION OF THE DRAWINGS

FIG. 1 is an environmental view of a person using a seat belt without the instant invention;

FIG. 2 is an environmental view of a person using a seat belt with the instant invention;

FIG. 3 is a perspective view of the instant invention;

FIG. 4 is a front elevational view of the instant invention;

FIG. 5 is a cross-sectional view taken along line 5—5 of FIG. 4;

FIG. 6 is a partial environmental perspective view of a second embodiment of the instant invention;

FIG. 7 is a perspective view of a second embodiment of the instant invention;

FIG. 8 is a partial environmental perspective view of the third embodiment of the instant invention; and FIG. 9 is a perspective view of a third embodiment of the instant invention.

Similar reference characters denote corresponding features consistently throughout the attached drawings.

DETAILED DESCRIPTION OF THE PREFERRED EMBODIMENTS

The first embodiment of the present invention consists of a seat belt adjustment band 10 which is to be attached to both the lap belt 14 and the shoulder belt 12 of a seat belt assembly (S) as shown generally in FIGS. 1-5. The seat belt adjustment band 10 comprises an elongated fabric sleeve 15. The elongated fabric sleeve 15 is made of a similar webbing material as that of an ordinary seat belt. Plastic stiffeners 18 are placed in the sleeve 15 and are secured in place by stitching 24.

The sleeve 15 is divided into three sections, a first end element 26, a middle element 28 and a second end element 30. The first end element 26 is connected to the middle element at a first fold line 27. The second end element 30 is connected to the middle element 28 by a second fold line 29. Both the first end element 26 and the second end element 30 are planar and have an inside section and an outside section. Hook and loop fastening means 20, 22 (VELCRO TM) are mounted on the inside section of the first end element 26 and on the outside section of the second end element 30.

FIG. 3 shows the seat belt adjustment band 10 securing the lap belt 14 to the shoulder belt 12. The middle element 30 engages the lap belt 14 perpendicular to the lap belt 14. The first end element 26 and second end element 30 then surround the shoulder belt 12. The VELCRO (hook and loop) fasteners 20,22 are then matingly engaged thus securing the lap belt 14 to the shoulder belt 12.

FIG. 1 shows a seat belt assembly (S) without the seat belt adjustment band 10. FIG. 2 shows the seat belt assembly (S) with the seat belt attachment band 10 securing the shoulder belt 14 to the lap belt 12. The shoulder belt 12 is no longer in contact with the passenger 16, due to the fact that the shoulder belt 12 has been shifted away by the seat belt adjustment band 10.

A second embodiment of the instant invention is shown in FIGS. 6 and 7. Referring now specifically to FIG. 6, a seat belt adjustment band 30 for holding the shoulder belt 34 and the lap belt 32 separately is provided. The seat belt adjustment band 30 have two identical sections (36, 38) each section comprises a central portion 35 and two flaps (37, 39) which are designed to envelope a safety belt. The two identical sections (36, 38) are connected together about a central region 31. The two flaps (37,39) have velcro connection means 29 secured thereto. The two identical sections are referenced as an upper section 38 and a lower section 36. The upper section 38 is designed to envelope the shoulder belt 34 and the lower section 36 is designed to envelope the lap belt 32. Since the upper section 38 is secured to the lower section 36 about the central region 31, the shoulder belt 34 is effectively secured to the lap belt 36. This has the effect of bringing the shoulder belt 34 away from the face and neck of the user. FIG. 7 is a perspective view of the dual seat belt adjustment bands 30. It shows the upper section 38 and the lower section 36 connected about the central region 31.

A third embodiment of the instant invention is shown in FIGS. 8 and 9. Referring now specifically to FIG. 8 a seat belt adjustment band 40 is shown connecting the lap belt 42 to the shoulder belt 44. The seat belt adjustment band 40 is permanently yet slidably mounted on the lap belt 42 by a sleeve member 46 which encircles the lap belt 42. The sleeve member 46 comprises a flexible elastic bottom element 48 and a firm upper element 50. Attached to both the right side and the left side of the upper element 50 are a right leave 60 and a left leave 62. Each leaf has velcro attachment means 65 secured thereto. The two leaves (60, 62) envelope the shoulder belt 44 and the velcro 65 secures the two leaves (60, 62) together about the shoulder belt 44. The lap belt 42 passes through a sleeve member 46 of the adjustment band 40.

Referring now to FIG. 9, the seat belt adjustment band is shown prior to installation. The hook and loop fasteners (VELCRO) are shown, the fasteners will secure the device to the shoulder belt.

It is to be understood that the present invention is not limited to the sole embodiment described above, but encompasses any and all embodiments within the scope of the following claims.

I claim:

1. An attachment for a seat belt assembly, said assembly comprising a lap belt and a shoulder belt, said attachment comprising:
   a sleeve comprised of fabric material, said sleeve having a first end element, a second end element and an intermediate element;
   a plurality of stiffener means enclosed within said sleeve, one of said plurality of stiffener means being located in each of said first end, second end and intermediate elements;
   hinge means located respectively between said intermediate element and said first end element and between said intermediate element and said second end element, for allowing the folding of said first end and second end elements relative to said intermediate element, said first end element and said second end element having an upper portion and a lower portion, respectively;
   a first attachment means secured to said upper portion of said first end element; and
   a second attachment means secured to said lower portion of said second end element; whereby
   said attachment encircles said lap belt and said shoulder belt and secures said lap belt to said shoulder belt in a parallel and overlying relationship by mating engagement of said first attachment means to said second attachment means.

2. An attachment for a seat belt assembly as claimed in claim 1 wherein said first attachment means and said second attachment means are a hook and loop type fastener.

3. An attachment for a seat belt assembly as claimed in claim 1 where said first plastic stiffener is secured by stitching.

4. An attachment for a seat belt assembly as claimed in claim 3 wherein said second plastic stiffener is secured by stitching.

5. An attachment for a seat belt assembly as claimed in claim 4 wherein said third plastic stiffener is secured by stitching.

6. An attachment for a seat belt assembly as claimed in claim 1 wherein said fabric material is comprised of seat belt webbing material.

7. An attachment for a seat belt assembly as claimed in claim 1, further comprising; an elastic bottom element disposed beneath said intermediate element, thereby defining a sleeve assembly which encircles the lap belt, wherein said attachment is permanently and slidably mounted on the lap belt.

* * * * *